W. A. COLSTEN.
Liquid Cooler.
No. 84,996. Patented Dec. 15, 1868.
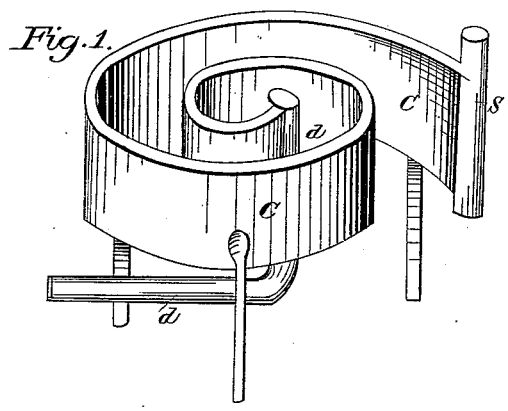
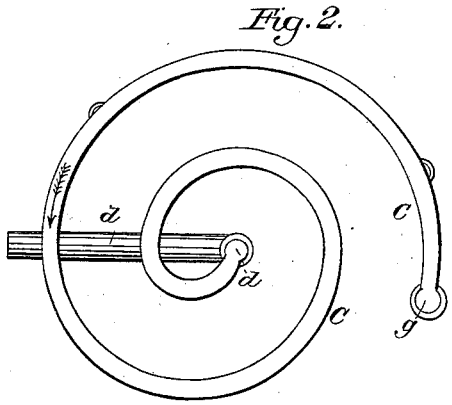
WITNESSES:
John Colsten
N. DuBorg
INVENTOR:
W. A. Colsten

WILLIAM A. COLSTEN, OF GREAT BEND, PENNSYLVANIA.

Letters Patent No. 84,996, dated December 15, 1868.

IMPROVED LIQUID-COOLER.

The Schedule referred to in these Letters Patent and making part of the same.

*To all whom it may concern:*

Be it known that I, WILLIAM A. COLSTEN, of Great Bend, in the county of Susquehanna, in the State of Pennsylvania, have invented a certain new and useful Improvement in Liquid-Coolers; and I do hereby declare that the following is a full, clear, and exact description of the construction and operation of the same, reference being had to the accompanying drawings, making a part of this specification, in which—

Figure 1 is a perspective view, and
Figure 2, a horizontal section.

The object of this invention is to provide a cheap and simple apparatus, by which any liquid, which it is desired to cool, may be passed through ice-water, or other cooling-mixture, without coming in contact therewith, and which apparatus may be placed inside of an ordinary ice-box or cylinder, and connected therewith by a supply-pipe and discharge-pipe.

The general form of the apparatus is shown in fig. 1.

$s$ is the supply-pipe, and
$d$, the discharge-pipe.

$c\ c$, the two parallel plates, of tin or other suitable metal, of the same width, and connected together at their upper and lower edges, so as to leave a narrow space between them, through which the liquid to be cooled passes.

These plates may be made of any desired width, and are coiled in a helical form, more or less compact.

They should be so coiled that the lower edges will gradually incline downward as they approach the discharge-pipe, so that the liquid may entirely drain out.

Fig. 2 shows the course of the channel or duct from the supply-pipe $s$ to the discharge-pipe $d$.

By this arrangement, the liquid to be cooled passes through the cooling-medium in a thin sheet, and comes in contact with a double cooling-surface, so that it is effectually cooled.

The space between the coils may be filled up with broken ice, and thus the liquid to be cooled will be brought in close contact with the ice, without partaking of its impurity.

I am aware that round pipes have been used for this purpose, which were coiled in a helical form, but these do not expose so much of the cooling-surface, and are more expensive than the parallel plates.

It is believed that this method of forming the channel or duct for cooling liquids is the most simple, cheap, and effectual that can be devised.

Having thus described my invention,

What I claim, and desire to secure by Letters Patent, is—

The arrangement of the two parallel plates $c\ c$, so as to form a thin, narrow channel or duct for cooling liquids, said channel being connected with a supply-pipe, $s$, and discharge-pipe $d$, the whole constructed and operating substantially as set forth.

W. A. COLSTEN.

Witnesses:
JOHN COLSTEN,
N. DU BOIS.